United States Patent
Kawanishi et al.

(10) Patent No.: US 6,670,989 B2
(45) Date of Patent: Dec. 30, 2003

(54) OPTICAL SYSTEM DRIVING CONTROL DEVICE AND CAMERA USING THE SAME

(75) Inventors: Toshiaki Kawanishi, Yokohama (JP); Masahiko Tsuzuki, Kawaguchi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/078,490

(22) Filed: May 14, 1998

(65) Prior Publication Data
US 2003/0179307 A1 Sep. 25, 2003

(30) Foreign Application Priority Data

| May 16, 1997 | (JP) | 9-143455 |
| Nov. 27, 1997 | (JP) | 9-326208 |
| May 6, 1998 | (JP) | 10-123374 |
| May 11, 1998 | (JP) | 10-145064 |

(51) Int. Cl.[7] .......... H04N 5/262; H04N 5/225; G03B 17/00; G03B 13/00
(52) U.S. Cl. .......... 348/240.99; 348/341; 348/335; 396/87; 396/379
(58) Field of Search .......... 348/335, 341, 348/358; 396/378, 80, 81, 373, 6, 75, 85, 86, 87, 379

(56) References Cited

U.S. PATENT DOCUMENTS

| 4,697,901 A | * | 10/1987 | Wakabayashi et al. | 396/378 |
| 5,548,334 A | * | 8/1996 | Ichiyoshi | 348/341 |
| 5,561,462 A | * | 10/1996 | Nagano | 348/335 |
| 5,612,737 A | * | 3/1997 | Nagano | 348/335 |
| 5,659,803 A | * | 8/1997 | Takagi et al. | 396/6 |
| 5,815,746 A | * | 9/1998 | Masuda | 396/81 |
| 5,940,632 A | * | 8/1999 | Tsuboi | 396/80 |
| 6,052,540 A | * | 4/2000 | Koyama | 396/378 |

FOREIGN PATENT DOCUMENTS

| JP | 5-333406 | 12/1993 |
| JP | 7-64141 | 3/1995 |

* cited by examiner

*Primary Examiner*—Ngoc-Yen Vu
*Assistant Examiner*—Luong Nguyen
(74) *Attorney, Agent, or Firm*—Fitzpatrick, Cella, Harper & Scinto

(57) ABSTRACT

An optical system driving control device includes (a) a photo-taking optical system having a photo-taking optical element which is movable in an optical axis direction thereof and a first driver for moving the photo-taking optical element in the optical axis direction thereof, (b) a viewfinder optical system having a viewfinder optical element which is movable in an optical axis direction thereof and a second driver for moving the viewfinder optical element in the optical axis direction thereof, and (c) a control circuit for causing the first driver and the second driver to set the photo-taking optical element and the viewfinder optical element to respective initial positions thereof and, after that, to move the photo-taking optical element and the viewfinder optical element to respective predetermined positions where a ratio in magnification of the photo-taking optical element to the viewfinder optical element becomes a predetermined value.

13 Claims, 8 Drawing Sheets

OPTICAL SYSTEM DRIVING CONTROL DEVICE AND CAMERA USING THE SAME

BACKGROUND OF THE INVENTION

1. Field of the Invention

The present invention relates to an optical system driving control device adapted for a photographic camera using a silver-halide film on a photo-taking plane or for a still camera or a video camera using a CCD as an image sensor, and also to an optical apparatus using the optical system driving control device.

2. Description of Related Art

Known photo-taking apparatuses (optical apparatuses) of the kind having a magnification varying action of a photo-taking optical system and that of a viewfinder optical system arranged to be performed in association with each other include, for example, cameras disclosed in Japanese Laid-Open Patent Application No. HEI 7-64141 and Japanese Laid-Open Patent Application No. HEI 5-333406.

The camera disclosed in Japanese Laid-Open Patent Application No. HEI 7-64141 is arranged to have a lens driving mechanism used mechanically in common for a photo-taking optical system and a viewfinder optical system. More specifically, a cam tube is arranged to be used as a lens driving mechanism in common for the photo-taking optical system and the viewfinder optical system and to be rotated and driven by a motor for a magnification varying action of the photo-taking optical system and also for that of the viewfinder optical system.

In the case of the camera disclosed in Japanese Laid-Open Patent Application No. HEI 5-333406, a photo-taking optical system and a viewfinder optical system are provided respectively with zoom driving mechanisms and driving motors for driving the zoom driving mechanisms. When the camera is loaded with a film, a microcomputer controls the driving motor of the photo-taking optical system and that of the viewfinder optical system in such a way as to cause the photo-taking optical system and the viewfinder optical system to perform their magnification varying actions in association with each other. In a case where the camera is not loaded with any film, the microcomputer controls the driving motor of the viewfinder optical system to cause only the viewfinder optical system to perform the magnification varying action.

In the camera disclosed in Japanese Laid-Open Patent Application No. HEI 7-64141, the magnification varying action of the photo-taking optical system and that of the viewfinder optical system are interlocked with each other by using a common cam tube. However, this arrangement has presented the following problems.

(i) The arrangement imposes design limitations on the layout of the photo-taking optical system and that of the viewfinder optical system.

(ii) In the case of a rear-focus type zoom lens of high magnification generally employed as a phototaking optical system for a video camera, it is difficult to ensure adequate precision of a cam arrangement or the like when mechanically interlocking the photo-taking optical system and the viewfinder optical system. Therefore, the arrangement lowers the optical performance of the photo-taking optical system.

The camera disclosed in Japanese Laid-Open Patent Application No. HEI 5-333406 is arranged to have the magnification varying action of the photo-taking optical system and that of the viewfinder optical system interlocked with each other. However, the magnification varying action of the viewfinder optical system is arranged to be performable independently of the photo-taking optical system. Therefore, in the mode of interlocking the magnification varying actions of these two optical systems, the driving motor of the photo-taking optical system is driven on the basis of data of the lens focal length of the photo-taking optical system computed from the lens position (focal length) of the viewfinder optical system and the magnification of electronic zooming. More specifically, the current lens position of the viewfinder optical system is detected with a zoom encoder by driving the driving motor of the viewfinder optical system and then the driving motor of the photo-taking optical system is driven on the basis of the focal length data of the lens of the photo-taking optical system corresponding to the current lens position detected. In other words, the magnification varying action of the photo-taking optical system is performed on the basis of the data of lens focal length corresponding to a lens position of the viewfinder optical system detected when a magnification varying action is performed. Therefore, for accurate control over the lens position of the photo-taking optical system to move it exactly to a desired position, the mechanism for detecting the lens position of the viewfinder optical system must be arranged to highly accurately act with a high degree of performance.

BRIEF SUMMARY OF THE INVENTION

It is an object of the invention to provide an optical system driving control device which is capable of driving a photo-taking optical system and a viewfinder optical system in an accurately interlocked state.

To attain the above object, in accordance with an aspect of the invention, there is provided an optical system driving control device, which comprises (a) a photo-taking optical system including a photo-taking optical element which is movable in an optical axis direction thereof and first driving means for moving the photo-taking optical element in the optical axis direction thereof, (b) a viewfinder optical system including a viewfinder optical element which is movable in an optical axis direction thereof and second driving means for moving the viewfinder optical element in the optical axis direction thereof, and (c) control means for causing the first driving means and the second driving means to set the photo-taking optical element and the viewfinder optical element to respective initial positions thereof and, after that, to move the photo-taking optical element and the viewfinder optical element to respective predetermined positions where a ratio in magnification of the photo-taking optical element to the viewfinder optical element becomes a predetermined value.

The optical system driving control device is preferably provided with magnification varying action switching means for switching between a first mode in which the first driving means and the second driving means are driven in association with each other and a second mode in which the first driving means and the second driving means are driven independently of each other.

In accordance with another aspect of the invention, there is provided an optical system driving control device, which comprises a photo-taking optical system having a variable magnification, a viewfinder optical system having a variable magnification, instruction means for giving an instruction for recording an image formed by the photo-taking optical system, and control means for controlling a magnification varying action of the photo-taking optical system and that of the viewfinder optical system, the control means providing control including a first step of performing only the magnification varying action of the viewfinder optical system and a second step of performing the magnification varying action of the photo-taking optical system to move the photo-taking optical system to a magnification varying position corresponding to a magnification varying position of the viewfinder optical system obtained by the first step, wherein the control provided by the control means shifts from the first step to the second step when the instruction for recording the image is given by the instruction means.

In accordance with a further aspect of the invention, there is provided a camera, which comprises a photo-taking optical system, an image sensor arranged to convert into an electrical signal an image formed by the photo-taking optical system, means for providing an electronic magnification varying zone where a part of the image is electronically magnified, and a viewfinder optical system having a variable magnification, an optical magnification varying zone of the viewfinder optical system encompassing the electronic magnification varying zone, and variation of magnification of the viewfinder optical system being performed by a driving mechanism arranged independently of the photo-taking optical system.

The above and other objects and features of the invention will become apparent from the following detailed description of preferred embodiments thereof taken in connection with the accompanying drawings.

DETAILED DESCRIPTION OF THE PREFERRED EMBODIMENTS

Hereinafter, preferred embodiments of the invention will be described in detail with reference to the drawings. In each of the embodiments, the invention is applied to the optical system driving control device of an optical apparatus such as a still camera or a video camera.

First Embodiment

Figure 1:
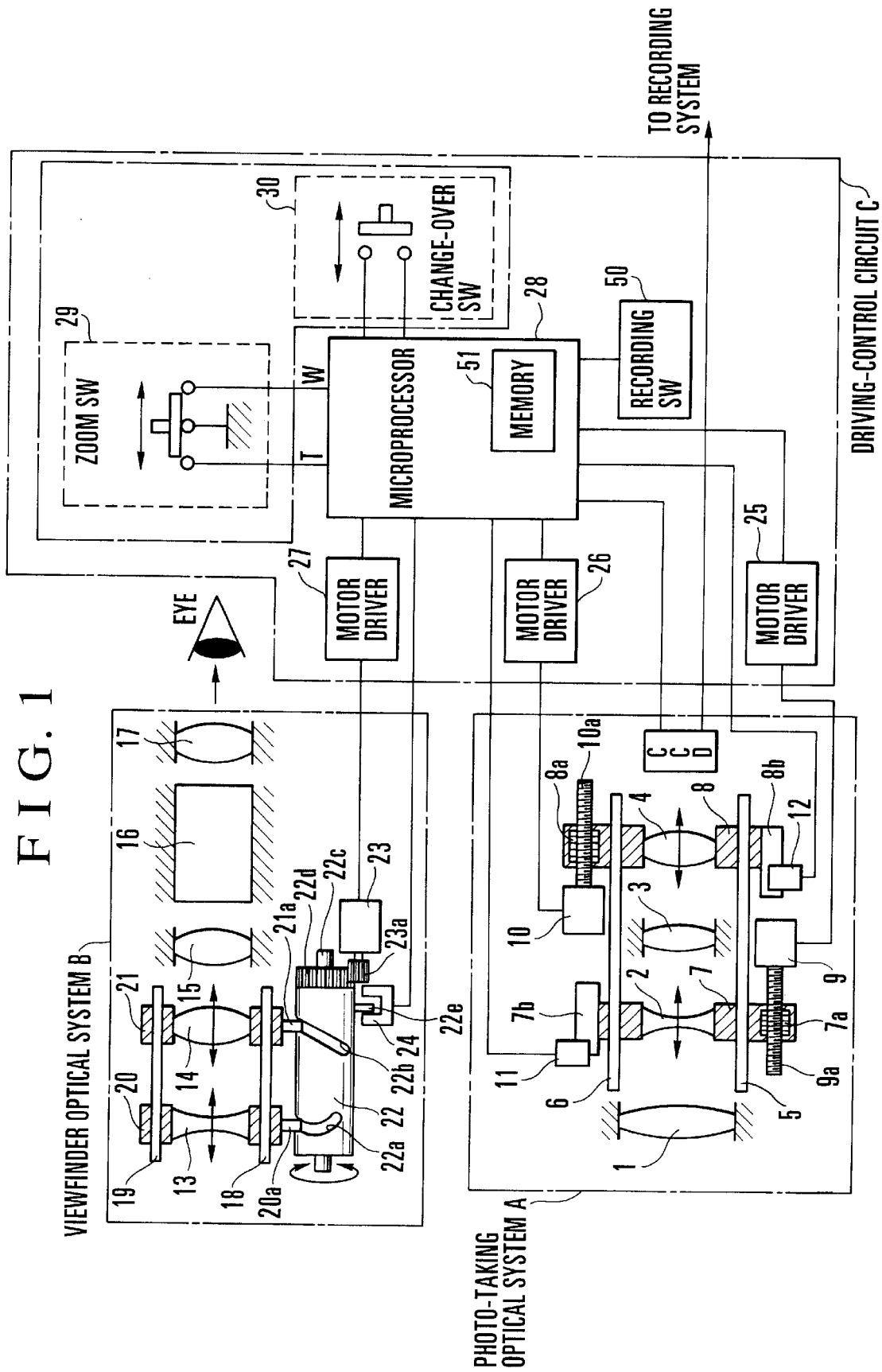
FIG. 1 is a block diagram showing an optical system driving control device according to a first embodiment of the invention.

FIG. 1 shows an optical system driving control device according to a first embodiment of the invention. The illustration includes a photo-taking optical system A and a viewfinder optical system B with their driving mechanisms and drive sources, and a control circuit arrangement.

The photo-taking optical system A is composed of optical elements including a field lens 1, a variator lens 2, an afocal lens 3 and a focusing lens 4. The variator lens 2 and the focusing lens 4 are respectively held by lens frames 7 and 8 and are arranged to be guided by guide shafts 5 and 6 to be movable back and forth in the optical axis direction as indicated by arrows.

The lens frames 7 and 8 are provided with rack parts 7a and 8a which are caused by an urging means (not shown) to be in mesh, without any play, respectively with the screw parts 9a and 10a of stepping motors 9 and 10, which are drive sources (first driving means). The variator lens 2 and the focusing lens 4 can be moved back and forth in the directions of arrows along the optical axis by causing the stepping motors 9 and 10 to normally and reversely rotate. The rack parts 7a and 8a of the lens frames 7 and 8 and the screw parts 9a and 10a of the stepping motors 9 and 10 jointly form a driving force transmission mechanism. The rack parts 7a and 8a are arranged to convert respectively the rotating motions of the stepping motors 9 and 10 into linear motions of the variator lens 2 and the focusing lens 4 in the optical axis direction.

The initial position of the variator lens 2 and that of the focusing lens 4 are detected by detecting that projections 7b and 8b, which are provided on the lens frames 7 and 8, pass through photo-interrupters 11 and 12, each of which is composed of a light emitting element and a light receiving element. In other words, an initial position detecting mechanism for detecting the initial positions of the variator and focusing lenses 2 and 4 is formed jointly by the photo-interrupters 11 and 12 and the projections 7b and 8b of the lens frames 7 and 8.

The projection 7b is formed in such a shape that permits detection of whether the variator lens 2 is on the side of a wide-angle zone or on the side of a telephoto zone. The other projection 8b is formed in such a shape that permits detection of whether the focusing lens 4 is within a zone on the side of focusing on an object located at a far distance or within a zone on the side of focusing on an object located at a near distance.

The viewfinder optical system B is composed of optical elements including an objective lens 13, a variator lens 14, a field lens 15 and an eyepiece 17. An optical path 16 is formed between the field lens 15 and the eyepiece 17. The objective lens 13 and the variator lens 14 are arranged to be guided through lens frames 20 and 21 by guide shafts 18 and 19, so as to be movable back and forth along the optical axis in the directions of the arrows.

The projections 20a and 21a, which are formed on the lens frames 20 and 21, are arranged to move following cam slots 22a and 22b formed in a cam tube 22, which is rotatably carried by a cam tube rotating shaft 22c. A stepping motor 23, which is a drive source (second driving means) is positioned in such a way as to minimize an intermeshing play between a gear part 22d of the cam tube 22 and a pinion gear 23a of the stepping motor 23. The objective lens 13 and the variator lens 14 are arranged to be movable back and forth in the directions of the arrows by causing the stepping motor 23 to rotate in normal and reverse directions. More specifically, a magnification varying mechanism is formed jointly by the projections 20a and 21a of the lens frames 20 and 21 and the cam slots 22a and 22b of the cam tube 22. The cam slots 22a and 22b of the cam tube 22 are arranged to convert the rotating motion of the cam tube 22 into linear motions of the objective lens 13 and the variator lens 14 in the optical axis direction.

The cam slot 22b, which is provided in the cam tube 22 for causing the variator lens 14 to perform a magnification varying action, is formed in such a shape as to attain the following effect. With the stepping motor 9 of the photo-taking optical system A driven at a predetermined pulse rate, when, after the lapse of a predetermined period of time, pulses are applied to the stepping motor 23 of the viewfinder optical system B at a predetermined pulse rate for synchronizing the magnification varying action of the viewfinder optical system B with that of the photo-taking optical system A, a ratio in magnification of the photo-taking optical system A to the viewfinder optical system B always is maintained constant.

The initial position of the cam tube 22, which enables the variator lens 14 to perform the magnification varying action, is detected by detecting that a projection 22e provided on the cam tube 22 passes through a photo-interrupter 24. In other words, an initial position detecting mechanism for detecting the initial position of the objective lens 13 and that of the variator lens 14 is formed jointly by the photo-interrupter 24 and the projection 22e of the cam tube 22.

The projection 22e is arranged in such a shape that permits detection of whether the variator lens 14 is in a telephoto side zone or in a wide-angle side zone.

A driving-control circuit C, serving as control means, includes motor drivers 25, 26 and 27 which are arranged respectively to drive the stepping motors 9, 10 and 23, a microprocessor 28, which is a driving control part arranged to control lens positions, and a magnification varying action selecting part which includes a zoom switch 29 as a first switch and a changeover switch 30 as a second switch.

The zoom switch 29 of the magnification varying action selecting part is provided for starting the magnification varying actions of the photo-taking optical system A and the viewfinder optical system B or the magnification varying action of the viewfinder optical system B alone. The zoom switch 29 is arranged to permit giving an instruction for the magnification varying action toward the telephoto side or toward the wide-angle side.

The change-over switch 30 is provided for selection of a mode in which the magnification varying action of the photo-taking optical system A and that of the viewfinder optical system B are to be performed independently of each other or another mode in which the magnification varying actions of the photo-taking optical system A and the viewfinder optical system B are to be performed in association with each other. For example, when the change-over switch 30 is turned on by a one-pushing operation thereon, the camera is set in an independent driving mode in which only the magnification varying action of the viewfinder optical system B is possible. When the change-over switch 30 is turned off by pushing it again, the camera is set in an interlocked driving mode in which the magnification varying action of the photo-taking optical system A and that of the viewfinder optical system B are to be performed in association with each other. When the independent driving mode is changed over to the interlocked driving mode, it is necessary either to reset the objective lens 13 and the variator lens 14 of the viewfinder optical system B to their positions obtained before they are set in the magnification varying positions or to cause the photo-taking optical system A to make a magnification varying motion in such a way as to adjust the magnification varying position of the photo-taking optical system A to the magnification varying position of the viewfinder optical system B.

The microprocessor 28 is provided with an internal storage device (memory) 51. Data of telephoto and wide-angle end positions of the variator lens 2 of the photo-taking optical system A with respect to its initial position is stored in the internal memory 51 in the form of numbers of steps corresponding to the rotating amount of the stepping motor 9.

Data of positions of the focusing lens 4 of the photo-taking optical system A determined by object distances and positions of the variator lens 2 with respect to its initial position is also stored in the form of numbers of steps corresponding to the rotating amount of the stepping motor 10.

In other words, the magnification varying action of the photo-taking optical system A is performed by controlling the stepping motor 9 according to a known electronic cam method which is carried out using cam data and is generally employed for video cameras or the like.

Data of telephoto and wide-angle end positions of the viewfinder optical system B with respect to the initial position of the cam tube 22 is also stored in the internal memory 51 of the microprocessor 28 in the form of numbers of steps corresponding to the rotating amount of the stepping motor 23.

In the optical system driving control device and the optical apparatus in the first embodiment, the zones of positions where the variator lens 2 and the focusing lens 4 o f the photo-taking optical system A and the cam tube 22 of the viewfinder optical system B are located are immediately found and determined when the power supply of a camera body (not shown) is turned on. Then, according to the results of such determination, the variator lens 2 and the focusing lens 4 of the photo-taking optical system A and the cam tube 22 of the viewfinder optical system B are driven respectively in predetermined directions to set them to their initial positions.

After completion of the initial position setting operation, the variator lens 2 and the focusing lens 4 of the photo-taking optical system A and the cam tube 22 of the viewfinder optical system B are set in positions where the ratio of the photo-taking magnification of the photo-taking optical system A to the magnification of the viewfinder optical system B becomes a predetermined value. At this time, the objective lens 13 and the variator lens 14 of the viewfinder optical system B are set in their predetermined positions by the cam tube 22.

After completion of the positioning process, if no signal indicating an on-state of the change-over switch 30 is found, the microprocessor 28 allows the magnification varying actions of the viewfinder optical system B and the photo-taking optical system A to be carried out in association with each other according to a signal coming from the zoom switch 29. In other words, the CPU of the microprocessor 28 causes the stepping motors 9 and 10 of the photo-taking optical system A and the stepping motor 23 of the viewfinder optical system B to be driven in an interlocked manner.

On the other hand, if an ON signal (indicating an on-state) of the change-over switch 30 is detected after completion of the positioning process, the microprocessor 28 allows only the magnification varying action of the viewfinder optical system B to be carried out. When the switching position of the change-over switch 30 changes from the independent driving mode position over to the interlocked driving mode position, the microprocessor 28 either causes the objective lens 13 and the variator lens 14 of the viewfinder optical system B to be reset and moved from their magnification varying positions to their initial positions obtained before the magnification varying action or causes the variator lens 2 and the focusing lens 4 of the photo-taking optical system A to be moved to positions where the magnification varying position of the photo-taking optical system A coincides with that of the viewfinder optical system B. In other words, the CPU of the microprocessor 28 causes the stepping motor 23 to be driven at the time of the magnification varying action of the viewfinder optical system B and the stepping motors 9 and 10 to be driven in adjusting the magnification varying position of the photo-taking optical system A to the magnification varying position of the viewfinder optical system B.

Second Embodiment

Figure 2:
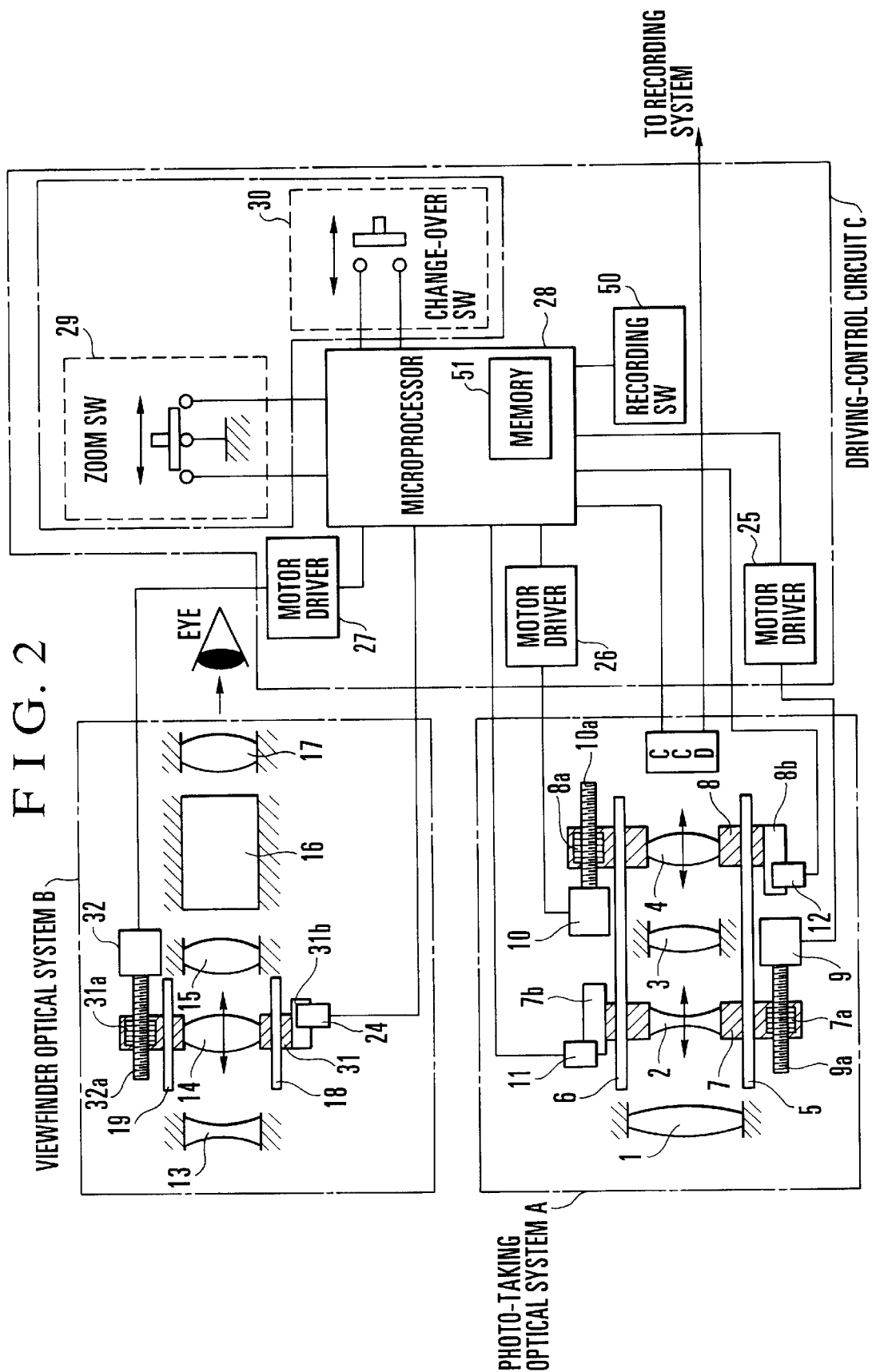
FIG. 2 is a block diagram showing an optical system driving control device according to a second embodiment of the invention.

FIG. 2 is a block diagram showing the arrangement of a second embodiment of the invention including a photo-taking optical system, a viewfinder optical system, driving mechanisms and drive sources of these optical systems and a control circuit.

The second embodiment is arranged in the same manner as the first embodiment except that the viewfinder optical system A is arranged differently, in a manner as described below. Therefore, the following describes only such parts that differ from the first embodiment.

The second embodiment differs from the first embodiment mainly in the method for driving the variator lens 14 of the viewfinder optical system B. In the case of the first embodiment, the objective lens 13 and the variator lens 14 are caused to move back and forth in the optical axis direction by the rotation of the cam tube 22. The second embodiment is arranged, on the other hand, to have the variator lens 14 moved back and forth in the optical axis direction by causing a stepping motor 32 to rotate in normal and reverse directions through a drive transmission mechanism which is composed of a rack part 31a of a lens frame 31 and a screw part 32a of the stepping motor 32. The rack part 31a and the screw part 32a are kept intermeshing without any play by some urging means (not shown). The drive transmission mechanism is arranged to convert, by the rack part 31a, the rotating motion of the screw part 32a of the stepping motor 32 into a linear motion which causes the variator lens 14 to move in the optical axis direction.

The initial position of the variator lens 14 is detected by detecting that a projection 31b provided on the lens frame 31 passes between a light emitting element and a light receiving element of the photo-interrupter 24. The projection 31b is arranged to be in such a shape that permits detection of the position of the variator lens 14 for finding whether it is located in a telephoto side zone or in a wide-angle side zone.

Since the viewfinder optical system B in the second embodiment is arranged as described above, the variator lens 14 is driven and controlled by the electronic cam method in the same manner as the photo-taking optical system A. Therefore, in the second embodiment, the data of telephoto and wide-angle end positions of the variator lens 14 with respect to its initial position is stored in the internal memory 51 of the microprocessor 28 as numbers of steps corresponding to the rotating amount of the stepping motor 32.

In the interlocked driving mode in which the magnification varying action of the photo-taking optical system A and that of the viewfinder optical system B are to be performed in association with each other, the stepping motors 9, 10 and 32 are driven and controlled in such a way as to synchronize the magnification varying action of the viewfinder optical system B and that of the photo-taking optical system A with each other and also to keep a ratio of the magnification of the photo-taking optical system A to the magnification of the viewfinder optical system B at a predetermined value.

The operation of the optical system driving control device in each of the first and second embodiments is next described in detail below with reference to FIGS. 3 and 4, which are flow charts.

Figure 3:
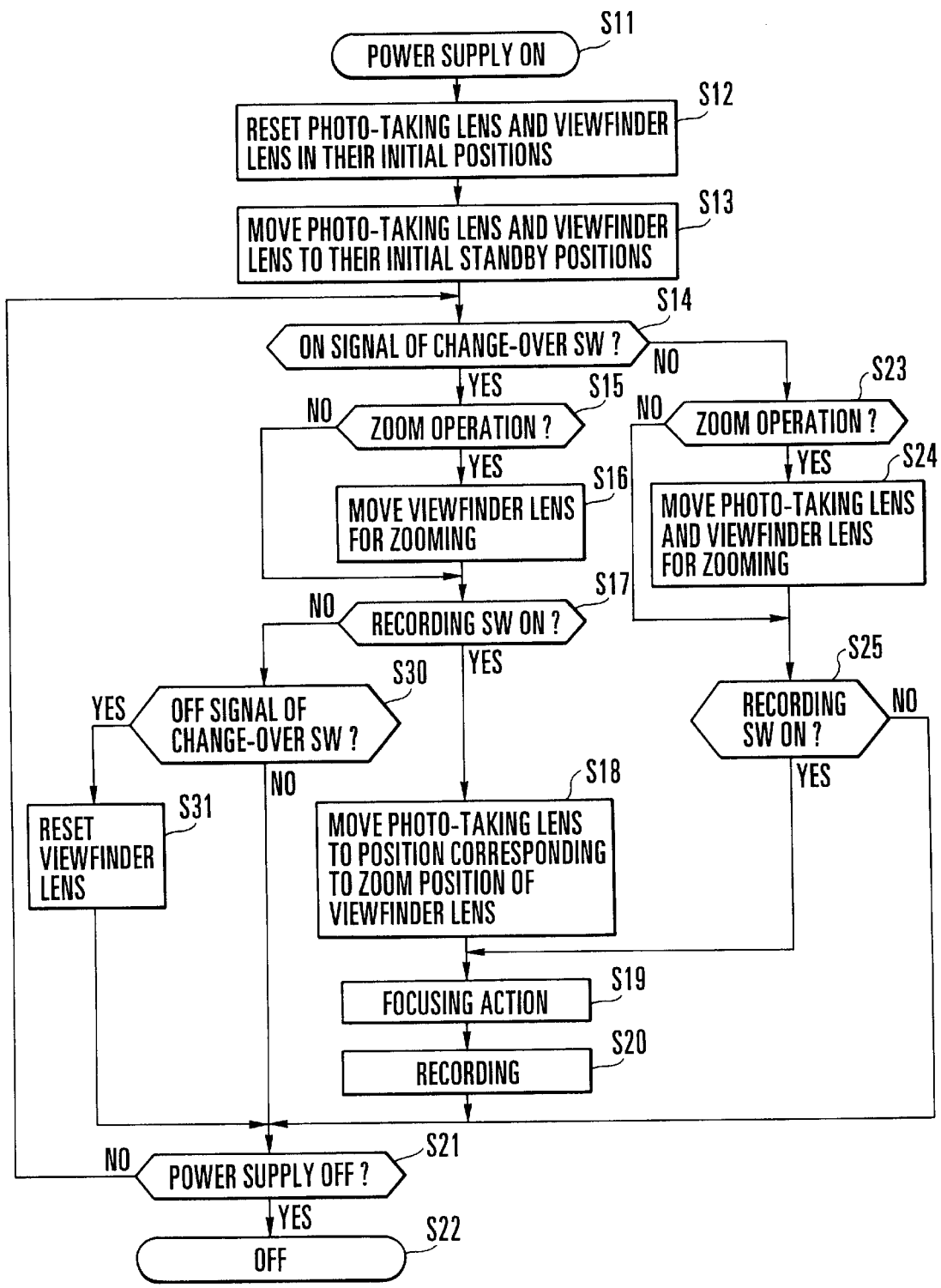
FIG. 3 is a flow chart showing by way of example an operation of each of the devices in the first and second embodiments.

FIG. 3 shows a case where the moving lens (including either both the objective lens 13 and the variator lens 14 or only the variator lens 14) is to be returned and reset in a position obtained before a magnification varying action, after the independent driving mode, in which only the viewfinder optical system is to be driven, is switched over to the interlocked driving mode, in which both the photo-taking optical system and the viewfinder optical system are to be driven in association with each other.

At a step S11 in FIG. 3, the power supply is turned on. At a step S12, the moving lenses of the photo-taking optical system A, including the variator lens 2 and the focusing lens 4, are driven respectively by the stepping motors 9 and 10 to be moved to their initial positions, which are detected by the photo-interrupters 11 and 12. At the same time, the moving lenses of the viewfinder optical system B, including either both the objective lens 13 and the variator lens 14 or only the variator lens 14, are driven by the stepping motor 23 or 32 to be moved to their initial positions, which are detected by the photo-interrupter 24. In other words, these moving lenses are reset respectively in their initial positions.

At a step S13, the moving lenses of the photo-taking optical system A and the moving lenses of the viewfinder optical system B are moved respectively to their initial standby positions, such as wide-angle end positions, where a ratio in magnification of the photo-taking optical system A to the viewfinder optical system B becomes a predetermined value (initial standby positions). The flow then proceeds to a step S14.

At step S14, the microprocessor 28 checks for the on-state of the change-over switch 30 (checks for an ON flag). The on-state of the change-over switch 30 indicates selection of the independent driving mode, in which the photo-taking optical system A and the viewfinder optical system B are drivable independently of each other and, under a magnification varying operation, the viewfinder optical system B has priority to be driven alone, so as to perform a magnification varying action. If the change-over switch 30 is found to be in its on-state, the flow proceeds to step S15. At step S15, the microprocessor 28 checks if the zoom switch 29 is operated. If so, the flow proceeds to step S16. At the S16, only the moving lens of the viewfinder optical system B is caused to move either from a wide-angle position to a telephoto position, or vice versa, according to the operation of the zoom switch 29.

At step S17, the microprocessor 28 checks if a recording switch 50, which is a recording button of a video camera, a release button of a still camera or the like, is operated or turned on. If so, the flow proceeds to step S18. At step S18, the moving lens of the photo-taking optical system A is moved to a position corresponding to the current zoom position of the viewfinder optical system B. Further, the position of each moving lens of the photo-taking optical system A corresponding to the current zoom position of the viewfinder optical system B is obtained by reading, from memory 51, information on a zoom position of the photo-taking optical system A corresponding to the current zoom position of the viewfinder optical system B. In other words, information on the zoom positions of the viewfinder optical system B and information on the zoom positions of the photo-taking optical system A are respectively stored in memory 51 for every zooming position.

At step S19, a focusing action is performed by driving the focusing lens 4 of the photo-taking optical system A. When an in-focus state is attained, the flow of operation proceeds to step S20. At step S20, recording is performed on a magnetic or optical recording medium or a memory. Upon completion of recording, the flow proceeds to step S21. At step S21, a check is made to find if the power supply of the camera body is turned off. If so, the flow proceeds to step S22 to turn off the power supply. If not, the flow returns to step S14.

If the recording switch 50 is found at step S17 to be not operated, the flow proceeds from step S17 to step S30. At step S30, a check is made to find if an OFF signal, which indicates an off-state of the change-over switch 30, is obtained. If not, the flow of operation proceeds to step S21. If so, the flow proceeds to step S31. At step S31, a resetting action is performed to bring the moving lens of the viewfinder optical system B back to its position obtained before the zoom switch 29 is operated, i.e., before the moving lens is moved at step S16. The terms "OFF signal" of the change-over switch 30 used above may sometimes mean a state of having no ON signal.

In a case where the change-over switch 30 is found at step S14 to be not in its on-state, the camera is in the interlocked driving mode, in which the moving lenses of both the photo-taking optical system A and the viewfinder optical system B are to be driven for magnification varying actions in association with each other. In this case, the flow of operation proceeds to step S23. At step S23, a check is made to find if the zoom switch 29 is operated. If so, the flow proceeds to step S24. At step S24, the moving lenses of the photo-taking optical system A and the viewfinder optical system B are moved simultaneously on the basis of information on positions stored in the memory 51 as mentioned above.

At the next step S25, the microprocessor 28 makes a check to find if the recording switch 50, which is either a recording button of a video camera or a release button of a still camera, is operated and turned on. If so, the flow proceeds to step S19. If not, the flow proceeds to step S21.

Figure 4:
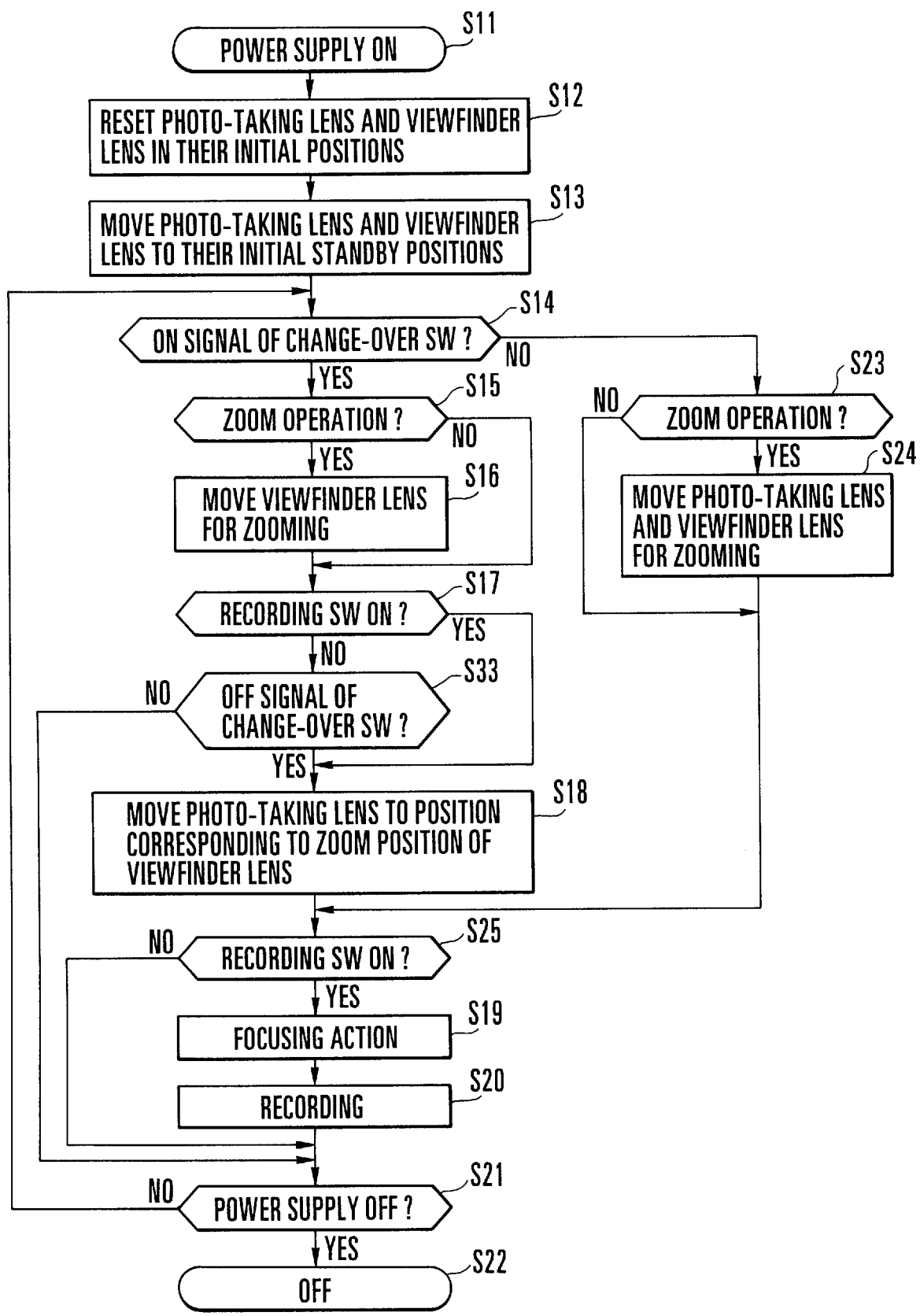
FIG. 4 is a flow chart showing another example of operation of each of the devices in the first and second embodiments.

FIG. 4 shows a case where the magnification varying position of the photo-taking optical system A is to be adjusted to the current magnification varying position of the viewfinder optical system B when the independent driving mode is changed over to the interlocked driving mode. In the flow chart of FIG. 4, steps indicated by the same step numbers as those of the flow chart of FIG. 3 are provided for the same actions as the corresponding steps shown in FIG. 3. Therefore, the details of the same steps are omitted from the following description.

Referring to FIG. 4, with the steps executed in the same manner as in the flow of operation shown in FIG. 3, if the recording switch 50 is found at step S17 to be not operated, the flow of operation of FIG. 4 proceeds to step S33. At step S33, a check is made for the OFF signal of the change-over switch 30. The flow of FIG. 4 differs from the flow of FIG. 3 in that, if the OFF signal of the change-over switch 30 is found at step 33, the flow proceeds to step S18, to move the moving lenses of the photo-taking optical system A to adjust the magnification varying position of the phototaking optical system A to the current magnification varying position of the viewfinder optical system B, and after that, the flow proceeds to step S25, to make a check again to find if the recording switch 50 is operated.

As described above, according to the arrangement of the optical system driving control device or the optical apparatus in the first or second embodiment of the invention, the optical elements, the driving mechanism (including the drive transmission mechanism and the magnification varying mechanism) and the drive source of the photo-taking optical system A are arranged independently of those of the viewfinder optical system B. The arrangement gives the following advantages.

(i) The design layout of the photo-taking optical system and that of the viewfinder optical system can be freely determined.

(ii) In the case of a rear-focus type zoom lens of high magnification generally employed as a photo-taking optical system for a video camera, it is difficult to ensure the adequate precision of cam arrangement or the like in mechanically interlocking the photo-taking and viewfinder optical systems. However, the arrangement described effectively solves that problem. Therefore, the optical performance of the photo-taking optical system can be prevented from being degraded by that problem.

(iii) The photo-taking optical system and the viewfinder optical system can be driven and controlled independently of each other.

Further, the change-over switch 30 is arranged to be operated in selecting the interlocked driving mode, in which the magnification varying action of the photo-taking optical system A and that of the viewfinder optical system B are to be performed in association with each other, or the independent driving mode, in which the magnification varying actions are to be performed independently of each other. Before making this selection, the microprocessor 28 of the driving-control circuit C causes the stepping motors 9 and 10 of the photo-taking optical system A and the stepping motor 23 (or 32) of the viewfinder optical system to be driven independently of each other. By this driving operation, the variator lens 2 and the focusing lens 4 of the phototaking optical system A are set in their initial positions on the basis of initial position detecting signals coming from the photo-interrupters 11 and 12 and the projections 7a and 8b. At the same time, the objective lens 13 and the variator lens 14 (or only the variator lens 14) of the viewfinder optical system B are set in their initial positions on the basis of an initial position detecting signal from the photo-interrupter 24 and the projection 22e (or from the photo-interrupter 24 and the projection 31b). After that, the stepping motors 9 and 10 of the photo-taking optical system A and the stepping motor 23 (or 32) of the viewfinder optical system B are driven and controlled so as to bring the variator lens 2 and the focusing lens 4 of the photo-taking optical system A and the objective lens 13 and the variator lens 14 (or only the variator lens 14) of the viewfinder optical system B to their positions where the magnification of the photo-taking optical system A and the magnification of the viewfinder optical system B become equal to each other.

When the zoom switch 29 is operated while the change-over switch 30 is not in its on-state, the microprocessor 28 causes the stepping motors 9 and 10 of the photo-taking optical system A and the stepping motor 23 (or 32) of the viewfinder optical system B to be driven in association with each other. Then, the magnification varying action of the photo-taking optical system A and that of the viewfinder optical system B are performed in a state of being interlocked with each other.

As described above, the magnification varying action of the photo-taking optical system A and the magnification varying action of the viewfinder optical system B are performed after the variator lens 2 and the focusing lens 4 of the photo-taking optical system A and the objective lens 13 and the variator lens 14 (or only the variator lens 14) of the viewfinder optical system B are set in positions where the magnification of the photo-taking optical system A and that of the viewfinder optical system B come to be in a predetermined ratio. Therefore, the positions of the variator lens 2 and the focusing lens 4 of the photo-taking optical system A and the objective lens 13 and the variator lens 14 (or only the variator lens 14) of the viewfinder optical system B can be accurately controlled to bring them respectively in desired positions.

Further, the arrangement for having the stepping motors 9 and 10 of the photo-taking optical system A and the stepping motor 23 (or 32) of the viewfinder optical system B electrically controlled by the microprocessor 28 effectively solves the problem that the optical performance of the photo-taking optical system A tends to be lowered in a case where the photo-taking optical system A and the viewfinder optical system B are mechanically interlocked with each other.

If the change-over switch 30 is operated to select only the magnification varying action of the viewfinder optical system B, the microprocessor 28 causes the stepping motor 23 or 32 to be driven to perform the magnification varying action of the viewfinder optical system B. After that, when the change-over switch 30 is released from the operation, the microprocessor 28 causes the stepping motors 9 and 10 of the photo-taking optical system A to be driven to perform the magnification varying action of the photo-taking optical system A by adjusting the magnification varying position of the photo-taking optical system A to that of the viewfinder optical system B. It is also possible to reset the viewfinder optical system B and, conversely, to adjust the magnification varying position of the viewfinder optical system B to that of the photo-taking optical system A.

While the invention is applied to the optical system driving control device of the rear-focus type and an optical apparatus using that optical system driving control device in the case of the first or second embodiment, the invention is not limited to the device or the optical apparatus of that type but is applicable to an optical system driving control device or an optical apparatus of any other type as long as the device or optical apparatus includes a lens system with a viewfinder.

Third Embodiment

Figure 5:
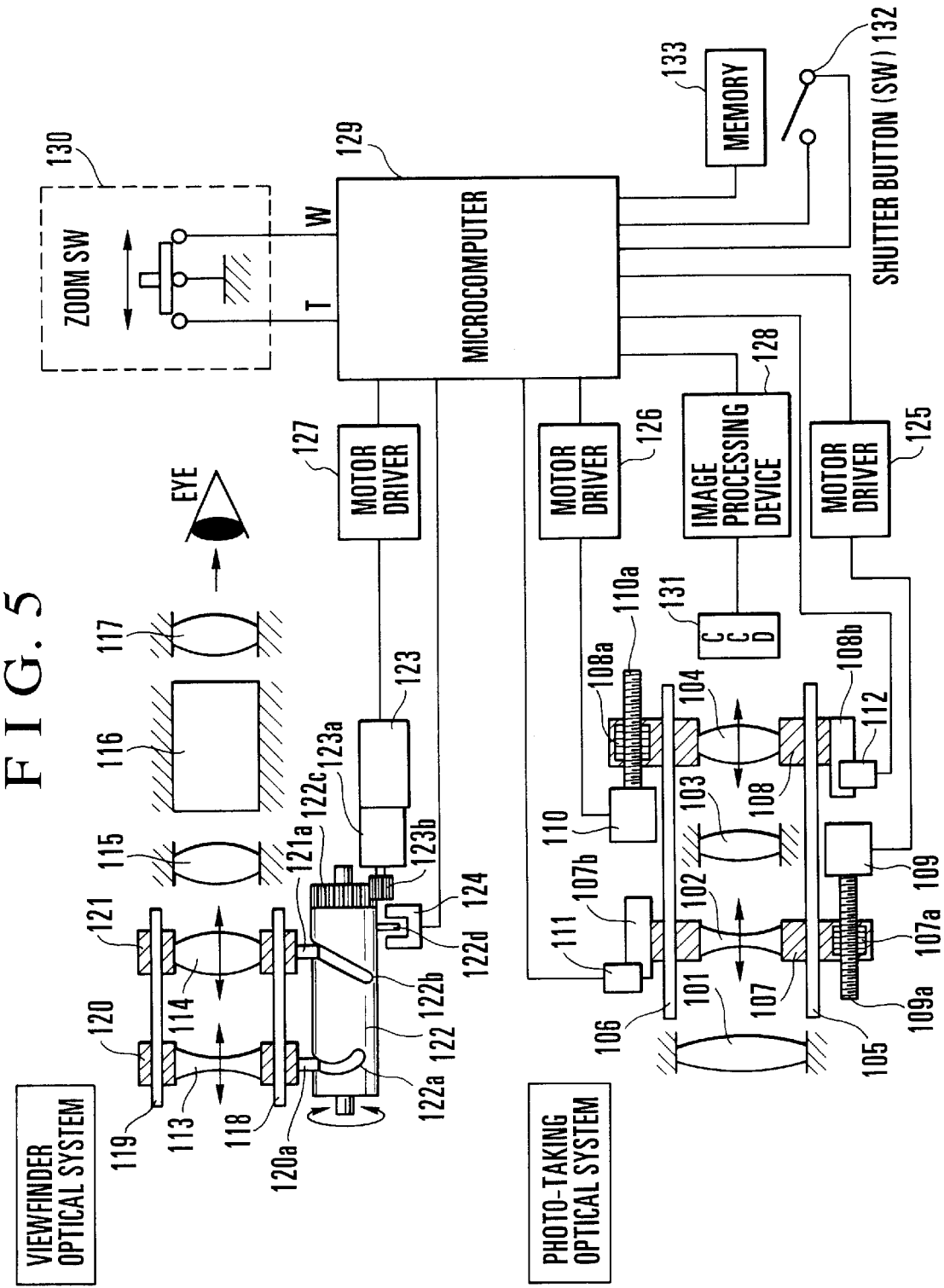
FIG. 5 is a block diagram showing an optical system driving control device according to a third embodiment of the invention.

FIG. 5 shows a photo-taking optical system, a viewfinder optical system, a driving mechanism for each of these optical systems, and a control circuit according to a third embodiment of the invention.

In the third embodiment, the photo-taking optical system is composed of a field lens 101, a variator lens 102, an afocal lens 103 and a focusing lens 104. The variator lens 102 and the focusing lens 104 are held respectively by lens frames 107 and 108 and are guided to be movable back and forth in the optical axis direction along guide bars 105 and 106.

Rack parts 107a and 108a, which are provided on the lens frames 107 and 108, and screw rod parts 109a and 100a of stepping motors 109 and 110, which are drive sources, are in mesh with each other without any play under the urging forces of an urging means (not shown). With the rack parts 107a and 108a and the screw rod parts 109a and 110a arranged in this manner, the variator lens 102 and the focusing lens 104 are moved back and forth in the optical axis direction when the stepping motors 109 and 110 rotate in normal and reverse directions.

Initial positions of the variator lens 102 and the focusing lens 104 are detected when projections 107b and 108b provided on the moving lens frames 107 and 108 pass through photo-interrupters 111 and 112, each of which is composed of a light emitting element and a light receiving element.

The viewfinder optical system is composed of objective lenses 113 and 114, a field lens 115, a prism 116 and an eyepiece 117. The objective lenses 113 and 114 are held respectively by lens frames 120 and 121 and are arranged to be movable back and forth in the optical axis direction along shafts 118 and 119.

The lens frames 120 and 121 are provided with projections 120a and 121a which are abutting respectively on cam slots 122a and 122b formed in a cam tube 122. The cam tube 122 is provided with a gear part 122c. The gear part 122c of the cam tube 122 is in mesh with an output gear 123b of a stepping motor 123 which has a reduction gear 123a. The objective lenses 113 and 114 move back and forth in the optical axis direction to perform a magnification varying action when the stepping motor 123 rotates in normal and reverse directions.

An initial position of the cam tube 122 is detected when a projection 122d provided on the cam tube 122 passes through a photo-interrupter 124.

A driving-control circuit is composed of motor drivers 125, 126 and 127 which are arranged to drive the above-stated stepping motors, an image processing device 128 which is arranged to process an image input from an image sensor (CCD) 131, a microcomputer 129 which is arranged to control the positions of the moving lenses, a zoom switch 130 which is arranged to input information about zooming in the telephoto and wide-angle directions, and a shutter button 132.

The microcomputer 129 shown in FIG. 5 is provided with an internal storage device. Data of telephoto and wide-angle end positions with respect to its initial position of the variator lens 102 of the photo-taking optical system is stored in the internal storage device in the form of numbers of steps corresponding to the amount of rotation of the stepping motor 109. Data of positions, relative to its initial position, of the focusing lens 104 determined by object distances and positions of the variator lens 102 is also stored in the internal storage device in the form of number of steps corresponding to the amount of rotation of the other stepping motor 110. In other words, the magnification varying action of the photo-taking optical system is thus arranged to be controlled by a so-called rear-focus zooming type electronic cam method which is generally used for video cameras.

The ratio of field of the viewfinder optical system to that of the photo-taking optical system is adjusted by mechanically fixing the photo-taking optical system and the viewfinder optical system. After that, data of adjusted positions of telephoto and wide-angle ends with respect to the initial position of the cam tube 132 is stored in the internal storage device of the microcomputer 129 in the form of number of steps corresponding to the amount of rotation of the stepping motor 123 of the viewfinder optical system.

Figure 6:
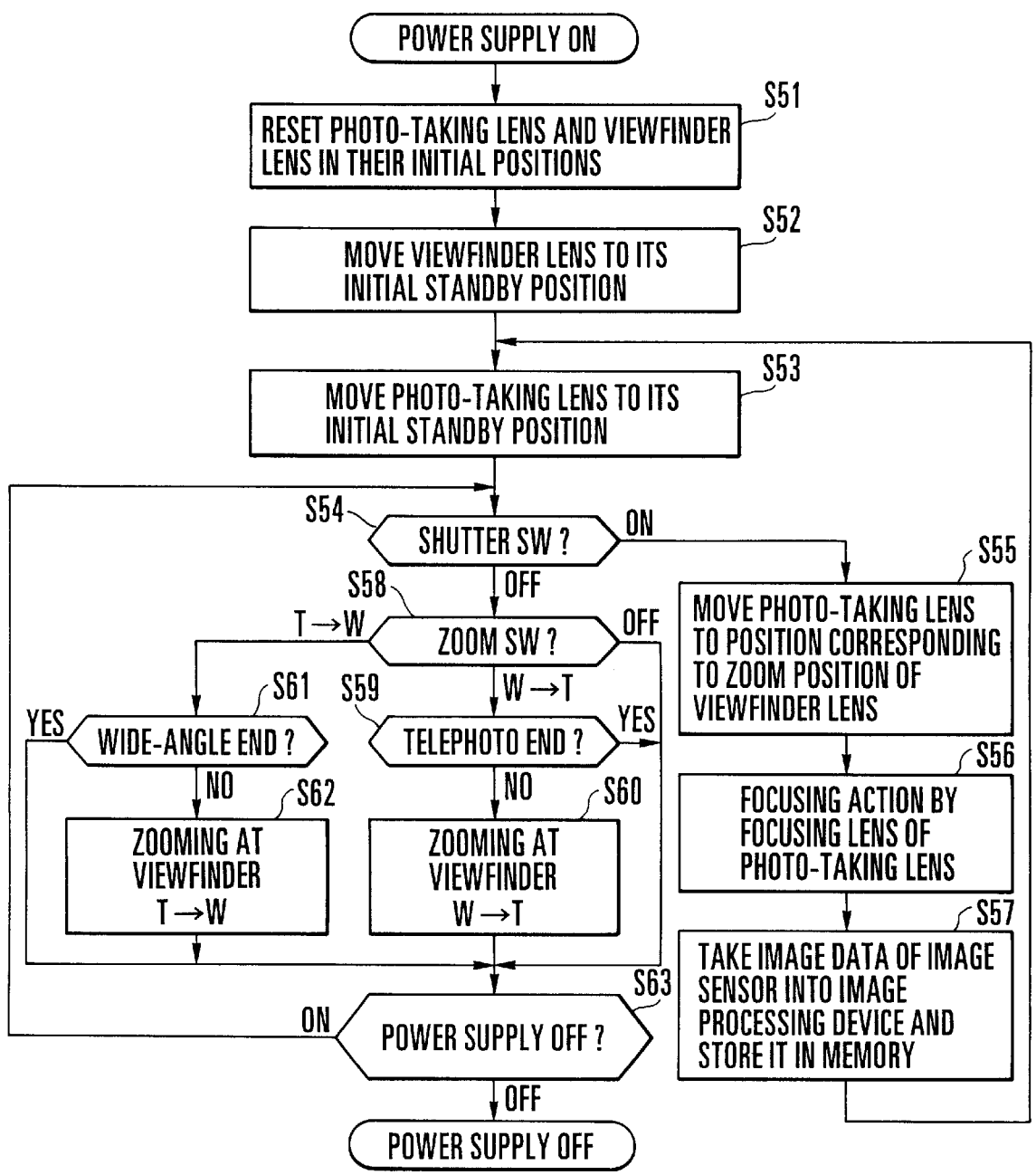
FIG. 6 is a flow chart showing an operation of the device in the third embodiment.

With the optical system driving control device in the third embodiment arranged in the above-stated manner, a sequence of actions of the device is described below with reference to FIG. 6, which is a flow chart.

With the photo-taking optical system and the viewfinder optical system in the third embodiment arranged as described above, the variator lens 102 and the focusing lens 104 of the photo-taking optical system and the cam tube 122 of the viewfinder optical system are respectively set in their initial positions at step S51. At steps S52 and S53, these moving lenses are set respectively in arbitrary initial standby positions located approximately in the middle points of their strokes of movement.

At step S54, when the shutter button or switch 132 is pushed by the operator of the camera, the flow of operation proceeds to step S55. At step S55, the focusing lens 104 of the photo taking optical system is moved toward an in-focus position. At step S56, after an in-focus state is attained, the flow proceeds to step S57. At step S57, an image input from the image sensor (CCD) 131 is taken in the image processing device 128 and is then stored or recorded in a memory 133. The flow then returns to step S53.

In a case where the operator is performing a zooming operation without pushing the shutter button (switch) 132 at step S54, the flow proceeds to step S58. At step S58, only the viewfinder optical system is driven. Then, a check is made for the direction in which the viewfinder optical system is driven. If the direction is found to be from the wide-angle position to the telephoto position, the flow proceeds to step S59 to find if the telephoto end is reached. If not, the flow proceeds to step S60. If the direction is found at step S58 to be from the telephoto position to the wide-angle position, the flow proceeds to step S61 to find if the wide-angle end is reached. If not, the flow proceeds to step S62. At step S60 or S62, the operator decides an angle of view at a desired zooming position. After that, the flow returns to step S54. When the shutter button (switch) 132 is pushed at step S54, the flow proceeds to step S55. At step S55, the variator lens 102 of the photo-taking optical system is moved, on the basis of data stored at the microcomputer 129, to a zooming position where the same field as the field of the viewfinder optical system can be obtained. At step S56, the focusing lens 104 of the photo-taking optical system is moved to an in-focus position. After an in-focus state is thus attained, the flow proceeds to step S57. At step S57, an image input from the image sensor 131 is taken in the image processing device 128 to be recorded in the memory 133.

After step S57, the flow immediately returns to the step S53 to have the variator lens 102 and the focusing lens 104 in their initial standby positions if the shutter button 132 is not pushed.

In the case of the third embodiment, the phototaking optical system is capable of performing a focusing action in addition to the magnification-varying or zooming action. However, the photo-taking optical system may be arranged to be capable of performing only the zooming action.

As described above, in the third embodiment, the driving device for the photo-taking optical system and the driving device for the viewfinder optical system are arranged independently of each other and, for example, pulse motors are used for these driving devices to permit pulse control. The arrangement of the third embodiment gives the following advantages.

(i) Since the positions of the moving lenses of the photo-taking optical system and the viewfinder optical system, such as their telephoto end positions and their wide-angle end positions, are controlled according to information on numbers of steps obtained from sensors, the mutual relation of these optical systems is simply adjustable by just varying the numbers of steps.

(ii) The layouts of the photo-taking and viewfinder optical systems can be freely designed.

Further, the control arrangement for allowing the photo-taking angle of view to be decided by zooming by the operator simply through the viewfinder optical system without moving the photo-taking optical system, before the shutter button is pushed, gives the following advantage.

(iii) Electric energy consumption required in taking pictures can be lessened.

Fourth Embodiment

The following describes a fourth embodiment of the invention. The fourth embodiment includes a phototaking optical system, a viewfinder optical system, driving mechanisms for these optical systems and a control circuit, which are all arranged in the same manner as the third embodiment shown in FIG. 5. Therefore, the details of these elements require no further description.

Figure 7:
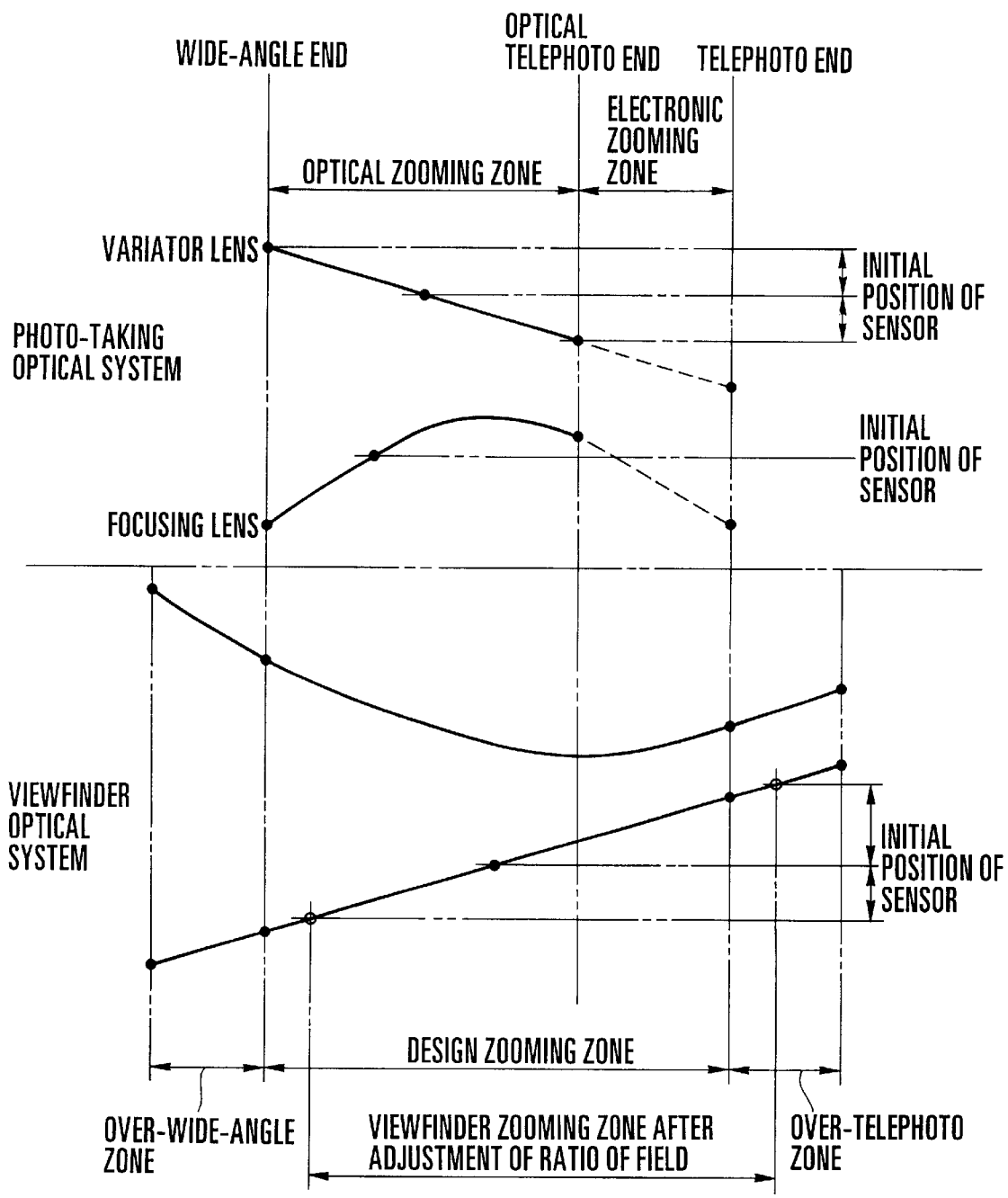
FIG. 7 shows a relation between the zooming zone of a photo-taking optical system and that of a viewfinder optical system in an optical system driving control device according to a fourth embodiment of the invention.

A feature of the fourth embodiment lies in that the viewfinder optical system is provided with a wider optical zooming zone than the photo-taking optical system, as shown in FIG. 7.

As mentioned in the foregoing, data of positions on the telephoto and wide-angle sides relative to the initial position of the variator lens 102 of the photo-taking optical system is stored, in the form of numbers of steps corresponding to the amount of rotation of the stepping motor 109, in the internal storage device of the microcomputer 129 shown in FIG. 5. Further, data about positions of the focusing lens 104 relative to the initial position of the focusing lens 104 and determined by object distances and positions of the variator lens 102 is also stored in the form of numbers of steps corresponding to the amount of rotation of the stepping motor 110.

In the case of the fourth embodiment, a so-called electronic zooming zone where a part of image data is electronically magnified is provided beyond an optical telephoto end of the photo-taking optical system, as shown in FIG. 7.

Meanwhile, the cam tube 122 of the viewfinder optical system is designed to include an over-wide-angle zone and an over-telephoto zone arranged beyond a zooming range corresponding to the whole zooming zone of the photo-taking optical system including the above-stated electronic zooming zone. The over-wide-angle zone and the over-telephoto zone of the viewfinder optical system are provided for adjustment of a ratio of field of the viewfinder optical system to the photo-taking optical system.

The ratio of field of the viewfinder optical system is adjusted to the photo-taking optical system by mechanically fixing the photo-taking optical system and the viewfinder optical system. After the adjustment, the adjusted positions on the telephoto side and the wide-angle side relative to the initial position of the cam tube 122 of the viewfinder optical system are stored in the internal storage device of the microcomputer 129 shown in FIG. 5 in the form of number of steps corresponding to the amount of rotation of the stepping motor 123.

Figure 8:
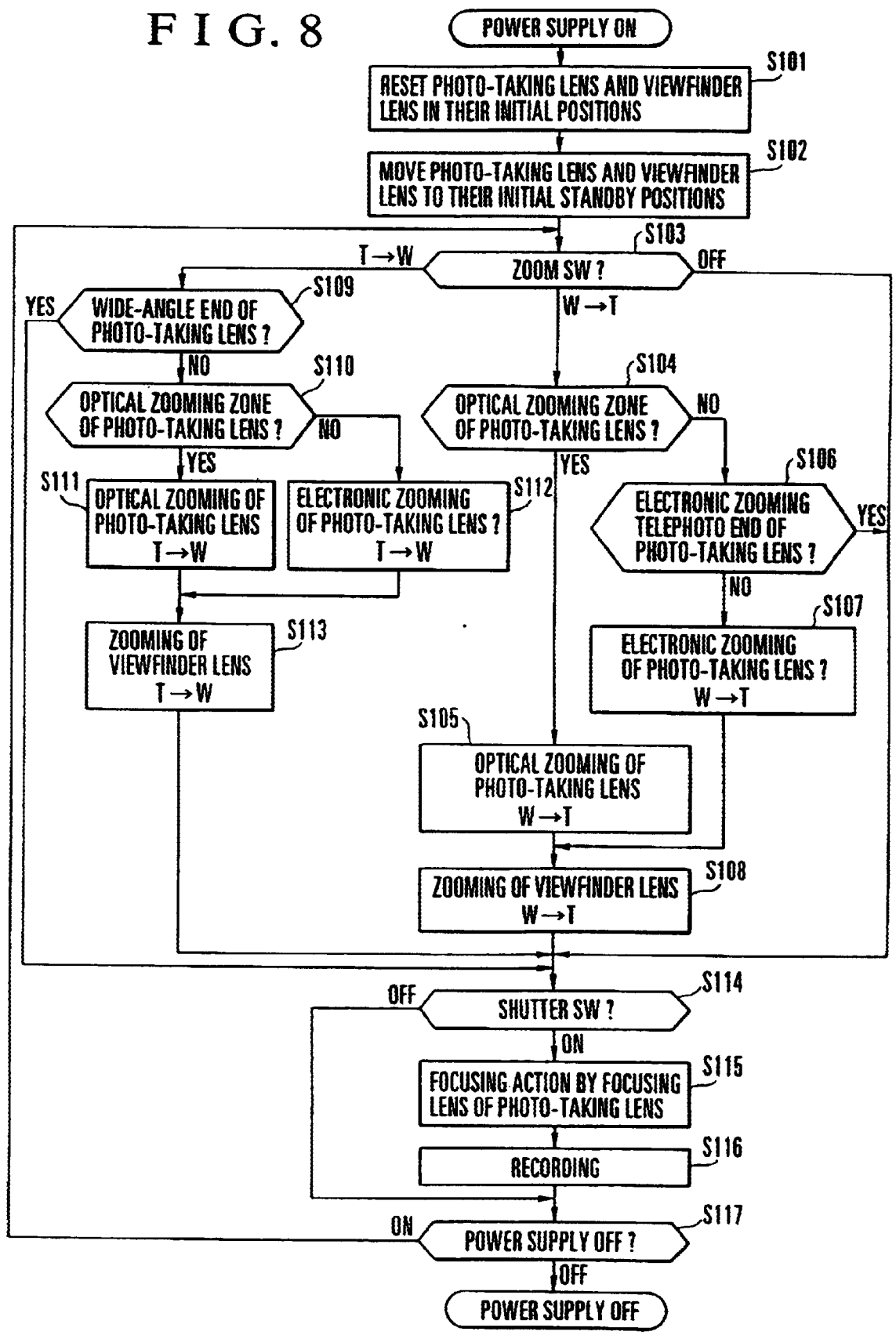
FIG. 8 is a flow chart showing an operation of the device in the fourth embodiment.

The optical system driving control device in the fourth embodiment operates in a manner as described below with reference to FIG. 8, which is a flow chart.

At step S101, the variator lens 102 and the focusing lens 104 of the photo-taking optical system and the cam tube 122 of the viewfinder optical system are respectively moved and set in their initial positions. At step S102, these moving lenses are respectively moved and set in arbitrary initial positions where a ratio in magnification between these optical systems becomes a predetermined value. After the positioning process, the flow of operation proceeds to step S103.

At step S103, the microcomputer 129 makes a check for an input signal from the zoom switch 130 to find the direction in which the magnification varying actions of the viewfinder and photo-taking optical systems are to be performed in association with each other.

After arrival of the zooming position of the photo-taking optical system at its telephoto end, if the zoom switch 130 still continues to output a signal for zooming toward the telephoto end, the variator lens 102 comes to a stop, and zooming enters the so-called electronic zooming zone where a part of image data of the image sensor 131 is electronically magnified. Meanwhile, the viewfinder optical system is arranged to show real-image type zooming covering the electronic zooming zone as mentioned above.

In the case of zooming, i.e., varying a magnification, from the wide-angle side toward the telephoto side, the flow of operation proceeds to step S104 to make a check to find if the current zooming position of the photo-taking optical system is in the optical zooming zone. If so, the flow proceeds to step S105 to allow the optical magnification varying action of the photo-taking optical system to be further carried on. If not, the flow proceeds to step S106 to make a check to find if the magnification varying action has reached the telephoto end of the electronic zooming zone. If so, the flow proceeds to step S114, which will be described later. If not, the flow proceeds to step S107 to allow the electronic magnification varying action of the phototaking optical system to be performed from the wide-angle side toward the telephoto end. At step S108, moving lenses of the viewfinder optical system are moved to zooming positions coinciding with the zooming position of the photo-taking optical system. The flow chart shows steps S105 and S108 or steps S107 and S108 as if these steps are executed in sequence. However, in actuality, these steps are almost simultaneously executed.

If zooming is found at step S103 to be performed from the telephoto side toward the wide-angle side, the flow proceeds to step S109. At step S109, the microcomputer 129 makes a check to find if the current zooming position of the photo-taking optical system is at the wide-angle end. If so, the flow proceeds to step S114 which will be described later. If not, the flow proceeds to step S110. At step S110, a check is made to find if the current zooming position is in the optical zooming zone. If so, the flow proceeds to step S111 to optically carry on the magnification varying (zooming) action. If not, the flow proceeds to step S112 to carry on the electronic magnification varying (zooming) action. At step S113, the moving lenses of the viewfinder optical system are moved to zooming positions coinciding with the zooming position of the photo-taking optical system. Like in the case of zooming from the wide-angle side toward the telephoto side, steps S111 and S113 or steps S112 and S113 are executed almost simultaneously.

At step S114, the microcomputer 129 makes a check for the state of the shutter switch 132. If the shutter switch 132 is found to be in an off-state, the flow proceeds to step S117. If the shutter switch 132 is found to be in an on-state, the flow proceeds to step S115. At step S115, a focusing action is carried out by driving the focusing lens 104 of the photo-taking optical system. When an in-focus state is thus attained, the flow proceeds to step S116 for a recording action. The recording action is performed on the memory 133. Upon completion of recording, the flow proceeds to step S117 to make a check to find if a turning-off operation is performed on a power supply switch provided on the camera body. If so, the power supply is turned off. If not, the flow returns to step S103.

The fourth embodiment is arranged to perform an optical zooming action by the photo-taking optical system. However, the arrangement of course applies also to a system wherein the photo-taking optical system is of the kind having a single focal length and the electronic zooming which enlarges a part of the image data of the image sensor is arranged to be carried out in association with an optical zooming action of a real-image type viewfinder optical system.

In the fourth embodiment, as described above, the driving device of the photo-taking optical system and that of the viewfinder optical system are arranged to be independent of each other and their zooming (or magnification varying) actions are interlocked by electrical control, and, in addition, the viewfinder optical system is arranged to have a zooming magnification which covers the electronic zooming zone of the photo-taking optical system. The arrangement gives the following advantages.

(i) The design layout of the photo-taking optical system and that of the viewfinder optical system can be freely determined.

(ii) Since the viewfinder optical system is arranged to be capable of responding to the electronic zooming action of the photo-taking system without using any liquid crystal, electrical energy consumption can be reduced.

(iii) Since the electronic zooming action can be carried out by the photo-taking system, the lens unit can be compactly arranged.

(iv) Since the positions of the moving lenses of the photo-taking optical system and the viewfinder optical system, such as their telephoto end positions and their wide-angle end positions, are controlled by information on numbers of steps obtained from sensors, the mutual relation of these optical systems is simply adjustable by just varying the numbers of steps.

What is claimed is:

1. An optical system driving control device comprising:

(a) a photo-taking optical system, said phototaking optical system including:
a photo-taking optical element which is movable in a first optical axis direction thereof, and
a first driving mechanism including a first stepping motor, for moving said phototaking optical element in the first optical axis direction;

(b) a viewfinder optical system, said viewfinder optical system including:
a viewfinder optical element which is movable in a second optical axis direction thereof, and
a second driving mechanism including a second stepping motor for moving said viewfinder optical element in the second optical axis direction;

(c) a first initial position detecting unit for detecting the initial position of said photo-taking optical element;

(d) a second initial position detecting unit for detecting the initial position of said view finder optical element; and (e) a control unit, said control unit causing said first driving mechanism and said second driving mechanism to drive said phototaking optical element and said viewfinder optical element, respectively, to locate said photo-taking optional element and said viewfinder optical element at respective initial positions thereof in accordance with outputs from said first and second initial position detecting units, and, thereafter to move said photo-taking optical element and said viewfinder optical element to respective predetermined positions where a ratio in magnification of said photo-taking optical system to said viewfinder optical system becomes a predetermined value.

2. An optical system driving control device according to claim 1, further comprising a magnification varying action switching unit for switching between a first mode, in which said first driving mechanism and said second driving mechanism are driven in association with each other, and a second mode, in which said first driving mechanism and said second driving mechanism are driven independently of each other.

3. An optical system driving control device according to claim 2, wherein the second mode, in which said first driving mechanism and said second driving mechanism are driven independently of each other, includes a mode in which only said second driving mechanism is driven without driving said first driving mechanism.

4. An optical system driving control device comprising:
(a) a photo-taking optical system, said photo-taking optical system including (i) a photo-taking optical element which is movable in a first optical axis direction thereof, and (ii) first driving means, including a first drive source, for moving said phototaking optical element in the first optical axis direction;
(b) a viewfinder optical system, said viewfinder optical system including (i) a viewfinder optical element which is movable in a second optical axis direction thereof, and (ii) second driving means, including a second drive source, for moving said viewfinder optical element in the second optical axis direction;
(c) control means for causing said first driving means and said second driving means to set said phototaking optical element and said viewfinder optical element to respective initial positions thereof and, after that, to move said photo-taking optical element and said viewfinder optical element to respective predetermined positions where a ratio in magnification of said photo-taking optical system to said viewfinder optical system becomes a predetermined value; and
(d) magnification varying action switching means for switching between a first mode, in which said first driving means and said second driving means are driven in association with each other, and a second mode, in which said first driving means and said second driving means are driven independently of each other,
wherein the second mode, in which said first driving means and said second driving means are driven independently of each other, includes a mode in which only said second driving means is driven without driving said first driving means,
wherein said control means provides control including (i) a first step of performing only a magnification varying action of said viewfinder optical system by driving said second driving means without driving said first driving means, and (ii) a second step of returning said viewfinder optical element moved in the first step to a position obtained before the first step is performed, and
wherein the control provided by said control means shifts from the first step to the second step when the second mode is switched over to the first mode by said magnification varying action switching means.

5. An optical system driving control device or camera according to claim 4, further comprising:
instruction means for giving an instruction for recording an image formed by said photo-taking optical system, and
wherein said control means provides control including (a) a first step of performing only a magnification varying action of said viewfinder optical system by driving said second driving means without driving said first driving means, and (b) a second step of driving said first driving means so as to perform a magnification varying action of said photo-taking optical system by moving said phototaking optical system to a magnification varying position corresponding to the magnification varying position of said viewfinder optical system obtained in the first step,
where the control provided by said control means shifts from the first step to the second step when the instruction for recording the image is given by said instruction means.

6. An optical system driving control device comprising:
(a) photo-taking optical system, said phototaking optical system including (i) a photo-taking optical element which is movable in a first optical axis direction thereof, and (ii) first driving means, including a first drive source, for moving said phototaking optical element in the first optical axis direction;
(b) a viewfinder optical system, said viewfinder optical system including (i) a viewfinder optical element which is movable in a second optical axis direction thereof, and (ii) second driving means, including a second drive source, for moving said viewfinder optical element in the second optical axis direction;
(c) control means for causing said first driving means and said second driving means to set said phototaking optical element and said viewfinder optical element to respective initial positions thereof and, after that, to move said photo-taking optical element and said viewfinder optical element to respective predetermined positions where a ratio in magnification of said photo-taking optical system to said viewfinder optical system becomes a predetermined value; and
(d) magnification varying action switching means for switching between a first mode, in which said first driving means and said second driving means are driven in association with each other, and a second mode, in which said first driving means and said second driving means are driven independently of each other,
wherein the second mode, in which said first driving means and said second driving means are driven independently of each other, includes a mode in which only said second driving means is driven without driving said first driving means,
wherein said control means provides control including (i) a first step of performing only a magnification varying action of said viewfinder optical system by driving said second driving means without driving said first driving means, and (ii) a second step of driving said first driving means so as to perform a magnification varying action of said photo-taking optical system by moving said phototaking optical system to a magnification varying position corresponding to the magnification varying position of said viewfinder optical system obtained in the first step, and
wherein the control provided by said control means shifts from the first step to the second step when the second mode is switched over to the first mode by said magnification varying action switching means.

7. An optical system driving control device comprising:
a photo-taking optical system having a variable magnification;

a viewfinder optical system having a variable magnification;

instruction means for giving an instruction for recording an image formed by said photo-taking optical system;

control means for controlling a magnification varying action of said photo-taking optical system and that of said viewfinder optical system, said control means providing control including (a) a first step of performing only the magnification varying action of said viewfinder optical system without performing the magnification varying action of said photo-taking optical system; and (b) a second step of performing the magnification varying action of said photo-taking optical system to move said photo-taking optical system to a magnification varying position corresponding to a magnification varying position of said viewfinder optical system obtained in the first step; and a magnification varying action switching device that is configured to switch between an interlock mode in which the magnification varying action of said viewfinder optical system and the magnification varying action of said photo-taking optical system are performed in association with each other, and a non-interlock mode in which the magnification varying actions are performed independently of each other, wherein the control provided by said control means shifts from the first step to the second step when the instruction for recording the image is given by said instruction means, and wherein the control provided by said control means shifts from the first step to the second step in response to switching of said magnification varying action switching device from the non-interlock mode to the interlock mode.

8. A camera comprising an optical system driving control device according to claim 4.

9. A camera according to claim 8, further comprising an image sensor arranged to convert into an electrical signal an image formed by said photo-taking optical system.

10. A camera including an optical system driving control device, said optical system driving control device comprising:

a photo-taking optical system having a variable magnification;

a viewfinder optical system having a variable magnification;

instruction means for giving an instruction for recording an image formed by said photo-taking optical system;

control means for controlling a magnification varying action of said photo-taking optical system and that of said viewfinder optical system, said control means providing control including (i) a first step of performing only the magnification varying action of said viewfinder optical system without performing the magnification varying action of said photo-taking optical system, and (ii) a second step of performing the magnification varying action of said photo-taking optical system to move said photo-taking optical system to a magnification varying position corresponding to a magnification varying position of said viewfinder optical system obtained in the first step; and a magnification varying action switching device that is configured to switch between an interlock mode in which the magnification varying action of said viewfinder optical system and the magnification varying action of said photo-taking optical system are performed in association with each other, and a non-interlock mode in which the magnification varying actions are performed independently of each other, wherein the control provided by said control means shifts from the first step to the second step when the instruction for recording the image is given by said instruction means, and wherein the control provided by said control means shifts from the first step to the second step in response to switching of said magnification varying action switching device from the non-interlock mode to the interlock mode.

11. An optical apparatus having an image-taking element, comprising:

(a) photo-taking optical system, said photo-taking optical system including:
   a photo-taking optical element which is movable in a first optical axis direction thereof, and
   a first driving mechanism including a first stepping motor for moving said photo-taking optical element in the first optical axis direction;

(b) a viewfinder optical system, said viewfinder optical system including:
   a viewfinder optical element which is movable in a second optical axis direction thereof, and
   a second driving mechanism including a second stepping motor for moving said viewfinder optical element in the second optical axis direction;

(c) a first initial position detecting unit for detecting the initial position of said photo-taking optical element;

(d) a second initial position detecting unit for detecting the initial position of said viewfinder optical element; and (e) a control unit, said control unit causing said first and second driving mechanisms to drive said photo-taking optical element ad said viewfinder optical element, respectively, and to locate said photo-taking optical element and said viewfinder optical element at respective initial positions thereof in accordance with outputs from said first and second initial position detecting units, and, thereafter, to move said photo-taking optical element and said viewfinder optical element to respective predetermined positions where a ratio in magnification of said photo-taking optical system to said viewfinder optical system becomes a predetermined value.

12. An optical apparatus according to claim 11, further comprising a magnification varying action switching unit for switching between a first mode, in which said first driving mechanism and said second driving mechanism are driven in association with each other, and a second mode, in which said first driving mechanism and said second driving mechanism are driven independently of each other.

13. An optical apparatus according to claim 12, wherein the second mode, in which said first driving mechanism and said second driving mechanism are driven independently of each other, includes a mode in which only said second driving mechanism is driven without driving said first driving mechanism.

* * * * *

UNITED STATES PATENT AND TRADEMARK OFFICE
CERTIFICATE OF CORRECTION

PATENT NO. : 6,670,989 B2
DATED : December 30, 2003
INVENTOR(S) : Toshiaki Kawanishi et al.

It is certified that error appears in the above-identified patent and that said Letters Patent is hereby corrected as shown below:

Title page,
Item [*] Notice, insert -- This patent issued on a continued prosecution application filed under 37 CFR 1.53(d), and is subject to the twenty year patent term provisions of 35 U.S.C. 154(a)(2). --.

Column 1,
Line 20, "Application No." (close up right margin.)
Line 21, (Close up left margin.)

Column 3,
Line 31, "DRAWING" should read -- DRAWINGS --.

Column 6,
Line 30, "o f" should read -- of --.

Column 13,
Line 42, "the" (2nd occurrence) should be deleted.
Line 46, "phototaking" should read -- photo-taking --.

Column 14,
Line 10, "phototaking" should read -- photo-taking --.

Column 15,
Line 26, "phototaking" should read -- photo-taking --.

Column 16,
Lines 39, 44 and 61, "phototaking" should read -- photo-taking --.
Line 57, "view finder" should read -- viewfinder --.
Line 63, "optional" should read -- optical --.

Column 17,
Lines 22 and 31, "phototaking" should read -- photo-taking --.
Line 67, "and" should be deleted..

Column 18,
Lines 7, 16, 20, 29 and 56, "phototaking" should read -- photo-taking --.
Line 10, "step," should read -- step, and --.
Line 11, "where" should read -- wherein --.

UNITED STATES PATENT AND TRADEMARK OFFICE
CERTIFICATE OF CORRECTION

PATENT NO.    : 6,670,989 B2
DATED         : December 30, 2003
INVENTOR(S)   : Toshiaki Kawanishi et al.

It is certified that error appears in the above-identified patent and that said Letters Patent is hereby corrected as shown below:

Column 19,
Line 8, "(a)" should read -- (i) --.
Line 12, "(b)" should read -- (ii) --.

Column 20,
Line 18, "(a) photo-taking" should read -- (a) a photo-taking --.
Line 39, "ad" should read -- and --.

Signed and Sealed this

Seventeenth Day of August, 2004

JON W. DUDAS
*Acting Director of the United States Patent and Trademark Office*